(12) United States Patent
Ueda

(10) Patent No.: US 8,559,808 B2
(45) Date of Patent: Oct. 15, 2013

(54) IMAGING APPARATUS

(75) Inventor: Haruhisa Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/292,511

(22) Filed: Nov. 9, 2011

(65) Prior Publication Data

US 2012/0121240 A1    May 17, 2012

(30) Foreign Application Priority Data

Nov. 16, 2010  (JP) ................................. 2010-255860

(51) Int. Cl.
*G03B 13/30* (2006.01)
*G03B 13/16* (2006.01)

(52) U.S. Cl.
USPC ...... 396/150; 396/147; 396/378; 348/333.02; 348/346; 348/341

(58) Field of Classification Search
USPC ............................ 396/147, 150, 378; 348/341
See application file for complete search history.

(56) References Cited

U.S. PATENT DOCUMENTS

| | | | | |
|---|---|---|---|---|
| 5,103,254 A | * | 4/1992 | Bell et al. | 396/147 |
| 5,333,031 A | * | 7/1994 | Mukai | 396/242 |
| 5,903,788 A | * | 5/1999 | Mukai et al. | 396/373 |
| 6,226,461 B1 | * | 5/2001 | Homma et al. | 396/150 |
| 6,765,618 B1 | * | 7/2004 | Sato | 348/348 |
| 6,975,810 B2 | * | 12/2005 | Iwane | 396/100 |
| 7,053,953 B2 | * | 5/2006 | Belz et al. | 348/346 |
| 7,248,301 B2 | * | 7/2007 | Voss et al. | 348/346 |
| 2003/0156835 A1 | * | 8/2003 | Loo | 396/378 |

FOREIGN PATENT DOCUMENTS

JP  6-258693 A  9/1994

* cited by examiner

*Primary Examiner* — Clayton E Laballe
*Assistant Examiner* — Leon W Rhodes, Jr.
(74) *Attorney, Agent, or Firm* — Canon U.S.A., Inc., IP Division

(57) ABSTRACT

An imaging apparatus includes an imaging sensor, a reticle, a focus detection unit, a spectroscopic member, and a diffusion coefficient controller. The imaging sensor is configured to receive light from a lens unit. The reticle is capable of changing a diffusion coefficient. The focus detection unit is configured to detect a focus state of an imaging surface based on a signal from the imaging sensor. The spectroscopic member is configured to split the light from the lens unit to the reticle and the focus detection unit. The diffusion coefficient controller is configured to change the diffusion coefficient of the reticle. The diffusion coefficient controller controls a diffusion coefficient of a portion of the reticle corresponding to a defocus range to be higher than a diffusion coefficient of a portion of the reticle corresponding to a focusing range according to the focus state detected by the focus detection unit.

8 Claims, 4 Drawing Sheets

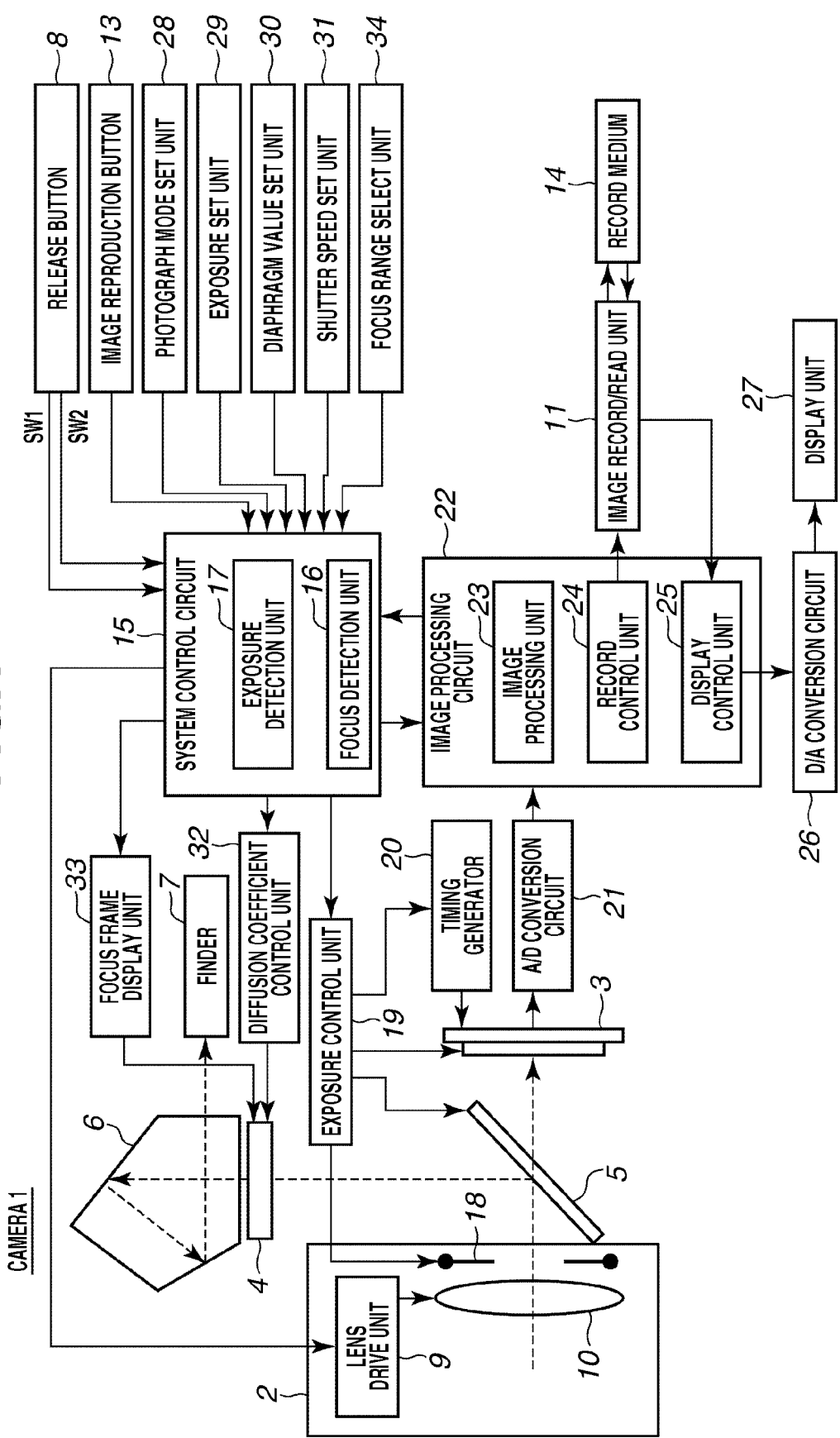

FIG.2A
FIG.2B
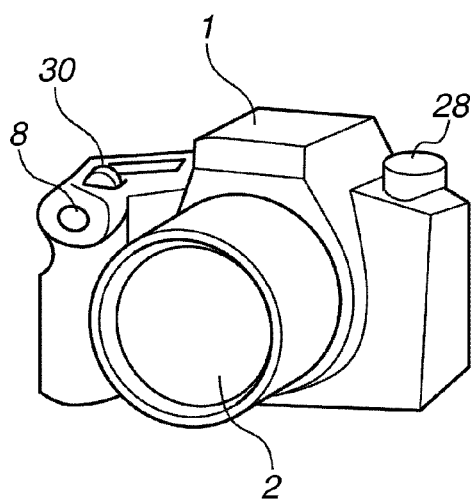
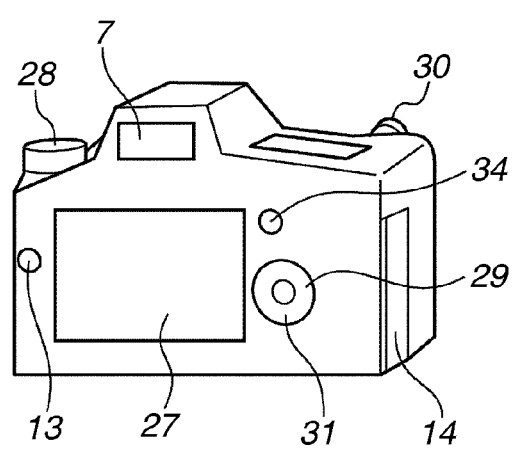

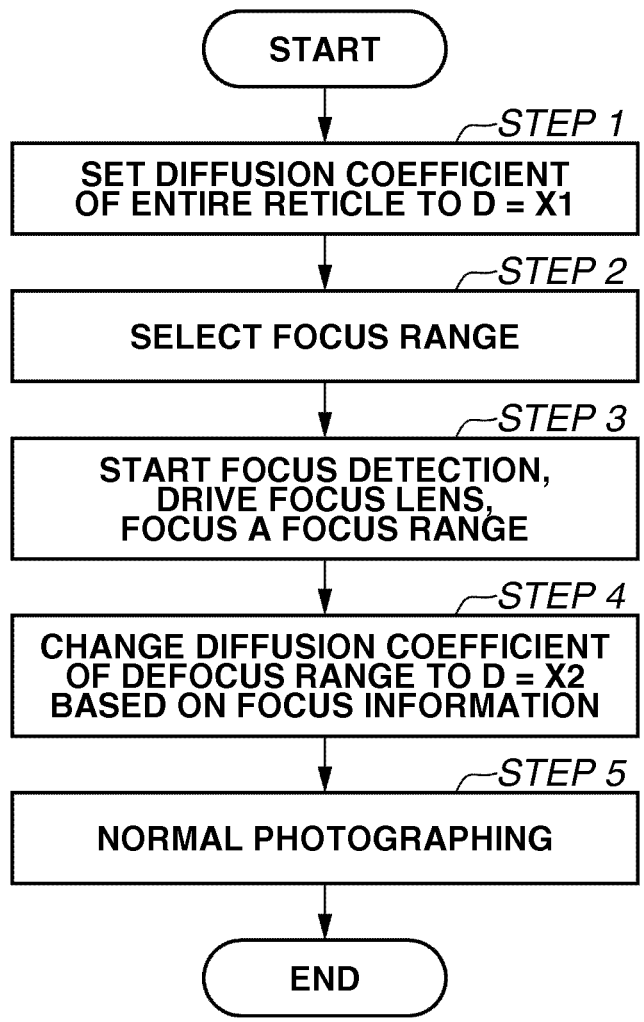

IMAGING APPARATUS

BACKGROUND OF THE INVENTION

1. Field of the Invention

The present invention relates to an imaging apparatus including a reticle being capable of changing a diffusion coefficient, and a method for controlling the imaging apparatus.

2. Description of the Related Art

Conventionally, an optical finder of a single-lens reflex camera used as an imaging apparatus requires brightness of a finder image and easiness of holding of a focus peak. Herein, the easiness of holding of the focus peak means that the greater a blur effect of a defocus part such as a background is, the clearer a difference between a focus part and the defocus part is, and a focus is easily confirmed. Therefore, a diaphragm of a photograph lens is generally put into an open state during finder observation, and passes much light, to make the finder image bright. The diaphragm passes a light beam with an angle. Therefore, a depth of field which is a focusing range is narrowed, to easily blur the defocus part such as the background, and thereby the focus peak is easily held.

In the single-lens reflex camera, light from a photograph lens is reflected by a main mirror, to form a finder image on a reticle. A photographer observes the finder image through a pentaprism and an eyepiece lens. The reticle has unevenness. The reticle diffuses light, to change a direction of the light beam with an angle, and makes the light beam arrive at a photographer's pupil. Thereby, the photographer can see a blurred image. A diffusion characteristic of the reticle is represented by a diffusion coefficient (transmittance) as a ratio of transmitting light and diffusing light. The higher the diffusion coefficient of the reticle is, the more remarkable the blurred image is, and the finder image having a focus peak easily held is formed. On the other hand, the higher the diffusion coefficient is, the darker the finder image is. Conversely, the lower the diffusion coefficient is, the brighter the finder image is. However, the blurred image cannot be seen, and the finder image having a focus peak hard to hold is formed. It is difficult to satisfy both the brightness of the finder image and the easiness of holding of the focus peak with one reticle.

When the finder image is dark, a photographic subject and a composition are hard to see. When the focus peak is hard to hold, the photographer cannot confirm a focus in focusing by autofocus, and may take a photograph in which the targeted focus position is blurred.

Then, for example, Japanese Patent Application Laid-Open No. 6-258693 discusses following technique. A photographer optionally switches among a brightness priority mode, a focus priority mode, and a depth priority mode. The brightness priority mode gives priority to brightness of a finder using a reticle using liquid crystal and capable of changing a diffusion coefficient. The focus priority mode has the shallowest depth of field in the finder. The depth priority mode gives priority to expression of a depth of field in photographing.

However, when the photographer switches to the focus priority mode or the depth priority mode giving priority to the expression of the depth of field in photographing in the conventional technique discussed in Japanese Patent Application Laid-Open No. 6-258693, the entire finder image is dark, and the photographic subject is hard to see. Therefore, even if the blur effect of the defocus part such as the background is increased, the photographic subject image which is the focus part is dark and is hard to see, which disadvantageously makes it difficult to confirm the focus. The conventional technique requires provision of a focus frame projection unit based on an light emitting diode (LED), or a liquid crystal plate capable of displaying the focus frame independently of a reticle, in order to display a focus frame representing a focus range on a finder.

SUMMARY OF THE INVENTION

The present invention is directed to an imaging apparatus capable of making a portion of a reticle corresponding to a focusing range is viewed brighter and of making a blurred image visible in a portion of a reticle corresponding to a defocus range.

According to an aspect of the present invention, an imaging apparatus includes an imaging sensor, a reticle, a focus detection unit, a spectroscopic member, and a diffusion coefficient controller. The imaging sensor is configured to receive light from a lens unit. The reticle is capable of changing a diffusion coefficient. The focus detection unit is configured to detect a focus state of an imaging surface based on a signal from the imaging sensor. The spectroscopic member is configured to split the light from the lens unit to the reticle and the focus detection unit. The diffusion coefficient controller is configured to change the diffusion coefficient of the reticle. The diffusion coefficient controller controls a diffusion coefficient of a portion of the reticle corresponding to a defocus range to be higher than a diffusion coefficient of a portion of the reticle corresponding to a focusing range. The control is performed according to the focus state detected by the focus detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a camera as an imaging apparatus which is an exemplary embodiment of the present invention.

FIGS. 2A and 2B illustrate an appearance of the camera of the exemplary embodiment.

FIG. 3 is a flow chart illustrating an operation of the camera of the exemplary embodiment.

DESCRIPTION OF THE EMBODIMENTS

Figure 4A:
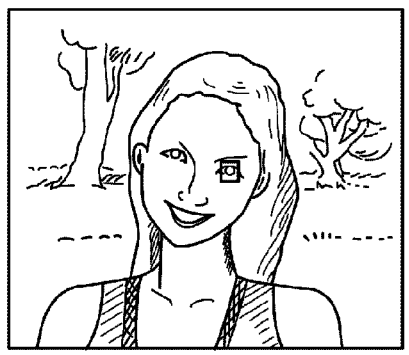
FIGS. 4A and 4B are schematic views illustrating an example partially changing a diffusion coefficient of a reticle.

Various exemplary embodiments, features, and aspects of the invention will be described in detail below with reference to the drawings.

First, a main configuration of a camera as an imaging apparatus which is an exemplary embodiment of the present invention will be described with reference to FIGS. 1 and FIGS. 2A and 2B. FIG. 1 is a block diagram illustrating an inner configuration of a camera 1. FIGS. 2A and 2B illustrate an external appearance of the camera 1. FIG. 2A illustrates a front perspective view of the camera 1, and FIG. 2B illustrates a back perspective view of the camera 1. A lens unit 2 is provided on the front of the camera 1, and light made incident from the lens unit 2 is configured to be focused onto an imaging unit 3 enabling focus detection and exposure detection in the camera 1. The imaging unit 3 receives the light from the lens unit 2, and enables photographing based on an electronic shutter. A spectral unit 5 which is a half mirror configured to reflect the light to a reticle 4 is interposed between the lens unit 2 and the imaging unit 3. The light reflected by the spectral unit 5 is focused onto the reticle 4, and is led to a photographer's pupil through a pentaprism 6 and a finder 7. The reticle 4 can change diffusion coefficient. The light transmits through the spectral unit 5 enters the imaging unit 3. When a user half-presses a release button 8 (SW1), the imaging unit 3 starts photometry and focus detection, and a lens drive unit 9 in the lens unit 2 drives a focus lens 10. Next, when the photographer full-presses the release button 8 (SW2), the imaging unit 3 makes the electronic shutter travel, to take a photograph. The imaging unit 3 performs an exposure operation to start electric charge accumulation and electric charge readout operation. A photograph image is recorded and stored in a recording medium 14 provided on a side surface of the camera 1 and attached to an image record/read unit 11. The image stored in the recording medium 14 is displayed on a display device 27 by pressing an image reproduction button 13 provided on a back of the camera 1.

Next, the camera 1 of the present exemplary embodiment has a system control circuit 15 configured to control the entire camera 1. The system control circuit 15 includes a central processing unit (CPU) and a micro processing unit (MPU) or the like, and controls an operation of each of circuits to be described later. The system control circuit 15 includes a focus detection unit 16. When the imaging unit 3 starts the focus detection, the system control circuit 15 controls the lens drive unit 9 based on a signal from the imaging unit 3, to drive the focus lens 10 in an optical axis direction, thereby performing focusing. The imaging unit 3 has a focus detection pixel group and a pupil-division lens group disposed in front of the focus detection pixel group in addition to an imaging pixel group. Examples of a focus detection method include imaging surface phase difference AF configured to perform focus detection based on a phase difference on an imaging surface, contrast AF configured to perform focus detection from a contrast ratio of an imaged image, and a wobbling method driving the imaging unit 3 back and forth in an optical axis direction, to perform contrast AF. The focus detection unit 16 can detect a focus state of the entire imaging surface. Since these methods are known, the descriptions thereof are omitted.

The system control circuit 15 includes an exposure detection unit 17. When the imaging unit 3 starts photometry, the exposure detection unit 17 determines a diaphragm value of a diaphragm 18 in the lens unit 2, an electronic shutter speed of the imaging unit 3, and an electric charge accumulation time according to a photograph condition preliminarily set by the user based on the signal from the imaging unit 3. When a photographing operation is started by the release button 8 (SW2), the system control circuit 15 controls travel drives of the diaphragm 18 and electronic shutter to determined values based on an exposure control unit 19. The system control circuit 15 makes the exposure control unit 19 to allow a timing generator 20 to output a pulse signal required when driving the imaging unit 3. The imaging unit 3 performs electric charge accumulation and electric charge readout operation according to the pulse signal output from the timing generator 20.

An electric charge read out from the imaging unit 3 is digitized by an A/D conversion circuit 21, and is sent to an image processing circuit 22. The sent image is subjected to white balance adjustment or image compression processing by an image processing unit 23 in the image processing circuit 22. The image is recorded and stored in the recording medium 14 via the image record/read unit 11 by the record control unit 24. The recording medium 14 is a commonly used SD card or Compact Flash (CF) card. The user presses the image reproduction button 13, and thereby the photograph image stored in the recording medium 14 is read into the display control unit 25 in the image processing circuit 22 by the image record/read unit 11. The photograph image is analogized by a D/A conversion circuit 26. The analogized image is displayed on the display device 27. The display device 27 maybe a commonly used liquid crystal display device or organic electroluminescence (EL) display device.

Although only the focus lens 10 is described as the lens unit 2 in the present exemplary embodiment, the lens unit 2 may have a zoom lens. The lens unit 2 may have an integrated constitution or a separate type constitution capable of being replaced. A main mirror and a sub-mirror may be rotatably disposed in place of the fixed spectral unit 5, and a focus detection unit based on phase difference AF may be provided independently of the focus detection unit 16 performing the focus detection based on the signal from the imaging unit 3. Since the above-mentioned constitutions are known, the descriptions thereof are omitted.

A method for setting a photograph condition will be described later. A photograph mode set unit 28 which is a dial operation member can set a photograph mode. For example, the photograph mode set unit 28 can set an automatic exposure mode, a diaphragm priority exposure mode (Av), a shutter speed priority exposure mode (Tv), a manual mode (M), and a bulb mode (B). When the photograph mode set unit 28 sets the photograph mode to the automatic exposure mode, a user optionally sets a proper exposure value based on an exposure set unit 29 which is the dial operation member. A diaphragm value and a shutter speed are automatically determined so as to be adjusted into proper exposure in photographing. In a case where the diaphragm priority exposure mode (Av), the shutter speed priority exposure mode (Tv), and the manual mode (M) is set, a diaphragm value set unit 30 and a shutter speed set unit 31 can optionally set the diaphragm value and the shutter speed. In a case where the bulb mode is set, when the user presses a release button 8 (SW2) photographing is started. While the user presses the release button 8 (SW2), the exposure continues. When the user releases the release button 8 (SW2), the exposure ends, and thereby, the shutter speed can be determined during photographing.

A method for changing a diffusion coefficient of a reticle 4 which is a feature of the present invention will be described later using a flow chart of FIG. 3 and a schematic view of FIG. 4 illustrating an example fully and partially changing the diffusion coefficient of the reticle. A camera 1 includes a diffusion coefficient control unit 32 configured to fully and partially change the diffusion coefficient of the reticle 4, a focus frame display unit 33 configured to display a focus range (also referred to as a focus area) on the reticle 4, and a focus range select unit 34 configured to move a position of a focus frame. The reticle 4 includes dot matrix liquid crystal in which a pixel-like liquid crystal group is arranged in a lattice. An electric charge is applied to the reticle 4 from the diffusion coefficient control unit 32 controlled by a system control circuit 15, to change alignment directions of molecules in each of the liquid crystals arranged in a lattice. Thereby, the diffusion coefficient of the reticle 4 can be partially changed. For example, the alignment directions of the liquid crystal molecules are horizontally arranged with respect to an optical axis direction of light reflected from a spectral unit 5, and thereby the diffusion coefficient of the reticle 4 can be reduced. The electric charge applied from the diffusion coefficient control unit 32 is changed in only a prescribed range of the reticle 4, and the alignment directions of the liquid crystal molecules are brought down from a horizontal state. Thereby, the diffusion coefficient of the reticle 4 can be partially increased.

Next, the photographer optionally selects the focus range based on the focus range select unit 34. The focus frame display unit 33 displays the focus frame showing the focus range on the reticle 4 based on control from the system control circuit 15. Examples of a method for displaying the focus frame include a method for projecting LED lighting on the reticle 4 and a method for separately superimposing liquid crystal for displaying a focus frame on the reticle 4. However, the methods increase parts for the LED lighting or a liquid crystal plate, to require a constituting space. Therefore, the diffusion coefficient of the focus range of the reticle 4 including the dot matrix liquid crystal is increased in a frame shape by the focus frame display unit 33 such that the focus range is displayed in a light-shielded state substantially.

Next, when the photographer turns on the power supply of the camera 1 in the method for changing the diffusion coefficient of the reticle 4, in STEP 1 of FIG. 3, the diffusion coefficient of the entire surface of the reticle 4 is first set to a diffusion coefficient D=X1 which is a predetermined value. This setting is performed before a focus detection unit 16 detects a focus state. The diffusion coefficient D=X1 gives priority to brightness of a finder image, and is a low value. The diffusion coefficient D=X1 is preliminarily set in the camera 1. When the photographer observes a finder 7, for example, as shown in FIG. 4A, the photographer can see a finder image including a bright photographic subject or entire background. The photographer confirms a composition easily. Separately, a change unit may be provided, and thereby the photographer can optionally change the diffusion coefficient D=X1. A diaphragm 18 of a lens unit 2 gives priority to the brightness of the finder image and the easiness of holding a focus peak, and is in an open condition.

Next, in STEP 2, the photographer operates the focus range select unit 34, to specify the focus range to be focused. A focus detection method based on the above-mentioned imaging unit 3 can move the focus range to a photographer's optional position. The focus frame display unit 33 displays the focus frame showing the focus range specified by the photographer on the reticle 4.

In STEP 3, when the photographer half-presses the release button 8 (SW1), the imaging unit 3 starts imaging. The focus detection unit 16 detects the focus state based on the output. An exclusive button for starting focus detection may be provided independently of the release button 8 (SW1). When the focus detection is started, the lens drive unit 9 in the lens unit 2 drives a focus lens 10 such that the focus range specified by the photographer in STEP 2 is focused, and thereby the specified focus range is focused.

Next, in STEP 4, the imaging unit 3 performs focus detection of the entire imaging surface, to specify a focusing range and a defocus range. For example, when the imaging unit 3 performs focus detection based on the imaging surface phase difference AF described above, the imaging unit 3 distinguishes the focusing range from the defocus range based on a threshold value of a phase difference preliminarily set in the camera 1. After the focus detection unit 16 detects the focus state, the diffusion coefficient of the portion of the reticle 4 corresponding to the defocus range is changed to diffusion coefficient D=X2 according to focus information (information of the focus state). The diffusion coefficient D=X2 gives priority to the easiness of holding the focus peak of the finder image, and a high value of diffusion coefficient is set such that satisfactory blurred image can be viewed. The diffusion coefficient D=X2 is preliminarily set in the camera 1. The diffusion coefficient of the portion of the reticle 4 corresponding to the focusing range maintains the diffusion coefficient D=X1. In this case, the relationship of the diffusion coefficient is set to X1<X2. Separately, a change unit may be provided, and thereby the photographer can optionally change the diffusion coefficient D=X2.

Figure 4B:
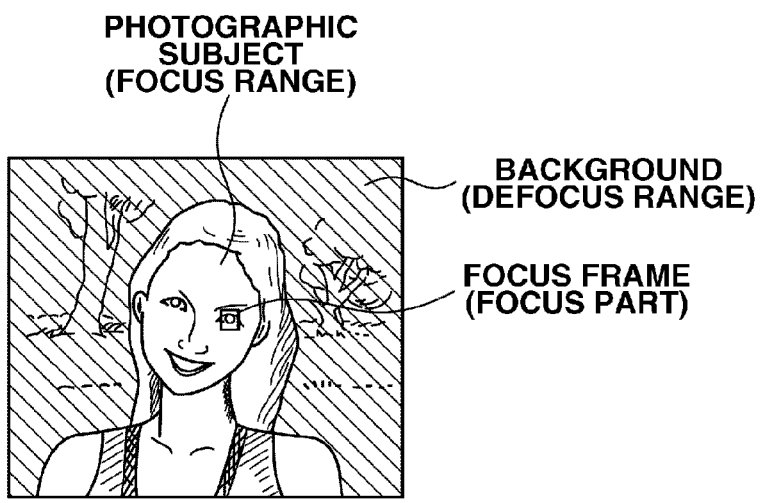

When the photographer observes the finder 7, for example, as shown in FIG. 4B, the photographic subject image being in the focusing range is brightly seen without being blurred, and the focus is easily confirmed. The background being in the defocus range is dark and viewed as the blurred image satisfactory, and the focus peak is easily held. In STEP 5, the photographer full-presses the release button 8 (SW2) to take a photograph.

As described above, the present exemplary embodiment can provide the camera which can brightly observe the focused photographic subject image even in the reticle capable of greatly displaying a blur effect of the defocus part (defocus range) such as the background, and has the reticle by which the photographic subject image can be viewed easily and the focus can be confirmed easily. The present exemplary embodiment can provide the camera having the reticle capable of displaying the focus frame simultaneously.

As described above, the exemplary embodiment of the present invention is described. However, the present invention is not limited to the present exemplary embodiment, and various modifications and variations can be made within the spirit and scope thereof. For example, the diffusion coefficient D=X1 of the reticle 4 is set to be low, to emphasize the easiness of confirming the composition in STEP 1 of FIG. 3. However, if the priority is applied to the focus confirmation, the diffusion coefficient D=X1 may be set to be high. In that case, in STEP 4, the diffusion coefficient of the portion of the reticle 4 corresponding to the focusing range distinguished by the information of the focus state may be changed to the diffusion coefficient D=X2. In this case, the relation of the diffusion coefficient is set to X1>X2.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-255860 filed Nov. 16, 2010, which is hereby incorporated by reference herein in its entirety.

What is claimed is:
1. An imaging apparatus comprising:
an imaging sensor configured to receive light from a lens unit;
a reticle being capable of changing a diffusion coefficient;
a focus detection unit configured to detect a focus state of an imaging surface based on a signal from the imaging sensor; and
a diffusion coefficient controller configured to change the diffusion coefficient of the reticle, wherein the diffusion coefficient controller controls a diffusion coefficient of a portion of the reticle corresponding to a defocus range to be higher than a diffusion coefficient of a portion of the reticle corresponding to a focusing range, wherein the control is performed according to the focus state detected by the focus detection unit.

2. The imaging apparatus according to claim 1, wherein the diffusion coefficient controller makes the diffusion coefficient of the portion of the reticle corresponding to the defocus range after the focus detection unit detects the focus state higher than that before the focus detection unit detects the focus state.

3. The imaging apparatus according to claim 1, wherein the diffusion coefficient controller makes the diffusion coefficient of the portion of the reticle corresponding to the defocus range after the focus detection unit detects the focus state lower than that before the focus detection unit detects the focus state.

4. The imaging apparatus according to claim 1, further comprising:
- a focus range select unit configured to select a focus range in which the focus detection unit detects a focus; and
- a focus frame display controller configured to display a focus frame showing the focus range selected by the focus range select unit on the reticle,
- wherein the diffusion coefficient controller increases the diffusion coefficient of the portion of the reticle corresponding to the focus frame, wherein the reticle is brought into a light-shielded state by increasing the diffusion coefficient.

5. An imaging apparatus comprising:
- an imaging sensor configured to receive light from a lens unit;
- a reticle being capable of changing a diffusion coefficient;
- a focus detection unit configured to detect a focus state of an imaging surface based on a signal from the imaging sensor;
- a spectroscopic member configured to split the light from the lens unit to the reticle and the imaging sensor; and
- a diffusion coefficient controller configured to change the diffusion coefficient of the reticle,
- wherein the diffusion coefficient controller controls a diffusion coefficient of a portion of the reticle corresponding to a defocus range to be higher than a diffusion coefficient of a portion of the reticle corresponding to a focusing range, wherein the control is performed according to the focus state detected by the focus detection unit.

6. The imaging apparatus according to claim 5, wherein the diffusion coefficient controller makes the diffusion coefficient of the portion of the reticle corresponding to the defocus range after the focus detection unit detects the focus state higher than that before the focus detection unit detects the focus state.

7. The imaging apparatus according to claim 5, wherein the diffusion coefficient controller makes the diffusion coefficient of the portion of the reticle corresponding to the defocus range after the focus detection unit detects the focus state lower than that before the focus detection unit detects the focus state.

8. The imaging apparatus according to claim 5, further comprising:
- a focus range select unit configured to select a focus range in which the focus detection unit detects a focus; and
- a focus frame display controller configured to display a focus frame showing the focus range selected by the focus range select unit on the reticle,
- wherein the diffusion coefficient controller increases the diffusion coefficient of the portion of the reticle corresponding to the focus frame, wherein the reticle is brought into a light-shielded state by increasing the diffusion coefficient.

* * * * *